United States Patent [19]

Larsen

[11] Patent Number: 4,881,441

[45] Date of Patent: Nov. 21, 1989

[54] STRINGED INSTRUMENT BLOCKING SYSTEM

[76] Inventor: John M. Larsen, Rte. 1, Box 23, Marsing, Id. 83639

[21] Appl. No.: 207,244

[22] Filed: Jun. 16, 1988

[51] Int. Cl.[4] .............................................. G01D 3/02

[52] U.S. Cl. .......................................... 84/291; 84/275

[58] Field of Search ................. 84/268, 275, 276, 291, 84/293

[56] References Cited

U.S. PATENT DOCUMENTS

| | | | |
|---|---|---|---|
| 492,948 | 3/1893 | Stelzner | 84/275 |
| 647,173 | 4/1900 | Almcrantz | 84/293 |

FOREIGN PATENT DOCUMENTS

| | | | |
|---|---|---|---|
| 4536 | 9/1893 | Sweden | 84/275 |

*Primary Examiner*—Lawrence R. Franklin
*Attorney, Agent, or Firm*—Frank J. Dykas; Craig M. Korfanta

[57] ABSTRACT

A blocking system 10 for a stringed musical instrument, such as an acoustical guitar which has a neck connected to a sound box 1 constructed from a top 2, back 4 and sides 3, uses a neck block 11 having a substantially isosceles triangular shape. Neck block 11 has equal length concave sides 12 and a convex base 13 and is attached to sound box 1 at the top 2, back 4, and sides 3. Tail block 15 is constructed having a substantially isosceles triangular shape with equal length concave sides 16 and convex base 17. Tail block 15 is of slightly smaller width than the height of side wall 3 and attached thereto so equal length sides 16 are symmetrically disposed about the longitudinal axis.

3 Claims, 3 Drawing Sheets

STRINGED INSTRUMENT BLOCKING SYSTEM

BACKGROUND OF THE INVENTION

1. Technical Field. This invention generally relates to the construction of stringed musical instruments. In particular this invention relates to a new blocking system for a stringed instrument such as an acoustical guitar.

2. Background Art. The art of guitar making, specifically acoustical guitars, has remained relatively unchanged for the past 250 years. Small improvements have been made in the bracing and neck block structure to help prevent flexing at the sound box and neck joint. Exemplary of these improvements are KAMAN, II., U.S. Pat. No. 4,172,405 and KAMAN, U.S. Pat. No. 4,200,023. Both disclose similar apparatus for providing a flex adjustable neck.

A notable exception to the relatively stagnant state of the acoustical guitar art is MARTIN, U.S. Pat. No. 3,911,778, which teaches a guitar molded from aluminum and synthetic materials. MARTIN teaches an aluminum die cast neck connected to a one-piece molded body having a bowl shape and flat top.

A particularly interesting development specifically relating to violins, is that of BERRY, ET AL., U.S. Pat. No. 1,800,980, which teaches a pair of hyperbolic shaped channels, one at each end, which divides the sound box of the violin into two separate resonant cavities.

A typical acoustical guitar is constructed from wood and has neck and tail blocks which are generally square in shape. The square shapes of the neck and tail blocks provide a discontinuous peripheral wall for the sound box of the guitar. It has been found, through practice, that a continuous wall produces a superior tone quality and resonant cavity. The typical construction necessarily requires the top of the guitar to be fitted with additional bracing to counteract the force moment enacted by the guitar strings and this substantially dampens the vibrations of the guitar top and therefore limits the dynamics of the overall guitar.

What is needed is a blocking system which provides a smooth peripheral wall surface and further provides a neck block which facilitates in the reduction of the necesary top braces.

It is therefore an object of this invention to enhance the tonal quality of stringed instruments by providing an optimum resonant cavity, and further a neck block which reduces the number of top braces thereby optimizing the dynamics of the overall instrument.

DISCLOSURE OF INVENTION

These objects are accomplished by a blocking system which has a neck and tail block having generally isosceles triangular shapes wherein the equal sides are concave in nature. The concave sides are curved such that when the block is attached to the peripheral walls of the instrument they provide a smooth transition from the wall surface to the block surface. The walls and neck block can be shaped so as to reflect sound waves back to centralized areas or focus point. The neck block has a width equal to the height of the peripheral walls, and is attached thereto, such that the equal concave sides are centered about the longitudinal axis of the guitar. The neck block is further attached to both the top and back of the sound box. The tail block on the other hand, is constructed with a thickness slightly less than the width of the walls. It is attached at the other end of the sound box to the walls such that its equal concave sides are centered about the longitudinal axis. Like the neck block, the tail block is also attached to the back of the sound box but is not, however, attached to the top of the sound box. This enhances the ability of the top to vibrate.

In a second embodiment, the tail block is slidably mounted to the side walls at the same general location as before but is not necessarily centered about the longitudinal axis. This particular embodiment provides an adjustable resonant cavity wherein the tail block may be positioned around the base arch of the instrument and therefore is able to alter the resonant cavity and tone.

BEST MODE FOR CARRYING OUT INVENTION

Figure 1:
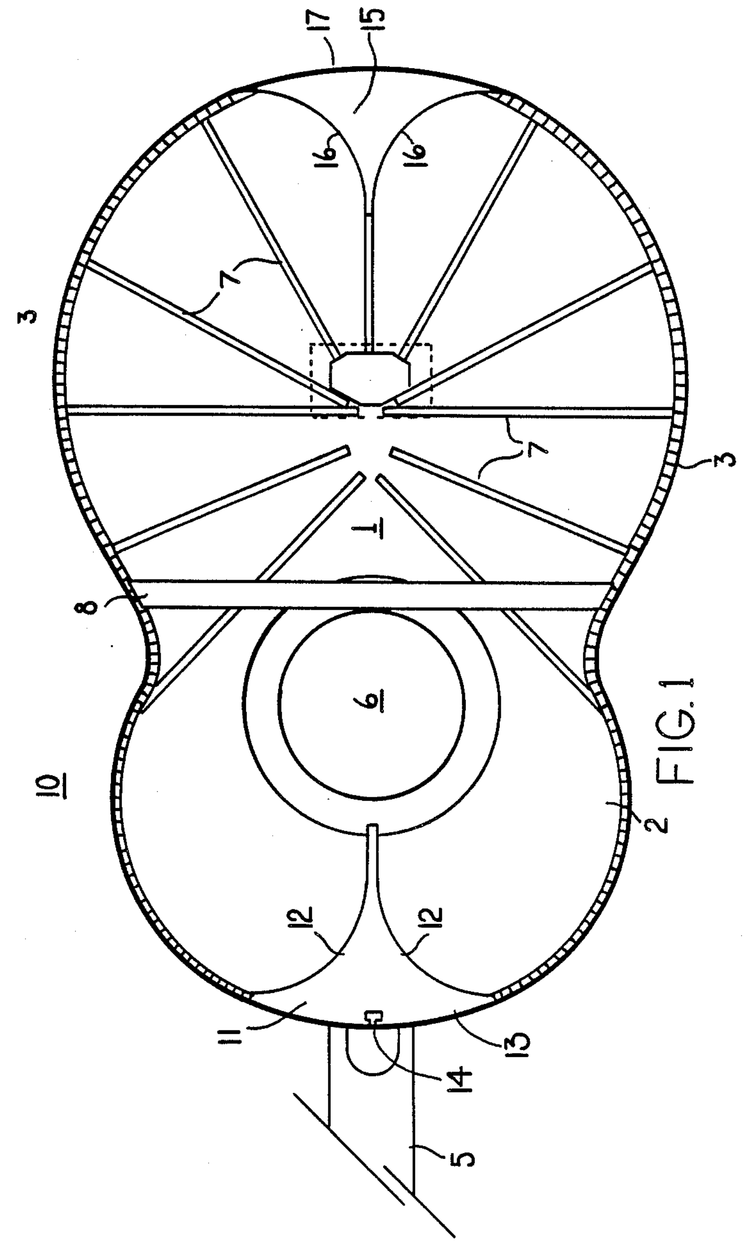
FIG. 1 is a sectional plan view of a guitar resting on its top, minus its back, showing a first embodiment of my new bocking system.

In its preferred embodiment, the present invention is illustrated in FIGS. 1 through 4 as applied to a flat top acoustical guitar, it should be readily apparent, however, that the present invention is equally applicable to all stringed instruments such as violins, cellos, and the like. Referring specifically now to FIG. 1, block system 10 is shown as apart of the interior construction of the sound box 1 on a flat top acoustical guitar. Sound box 1 is constructed using flat top 2, side walls 3, and a back which is not shown for the purposes of illustration. Top braces 7 are provided to prevent flexing of the guitar due to forces applied by the guitar strings. Flat top 2 has a sound hole 6 which is provided to pass sound waves to and from the interior of sound box 1. Main cross brace 8 is transversely attached to side walls 3 and provides torsional stability.

Neck block 11 is generally constructed having a basic isosceles triangular shape having concave sides 12 of equal length. A convex base 13 is provided and is generally contoured to match the inside contour of side walls 3. A mortise and tenon joint 14 provides an integral connection mechanism to connect the neck block 11 to guitar neck 5. Neck block 11 is attached to flat guitar top 2, such that its concave sides 12 are disposed symmetrically about the guitar's longitudinal axis.

Figure 2:
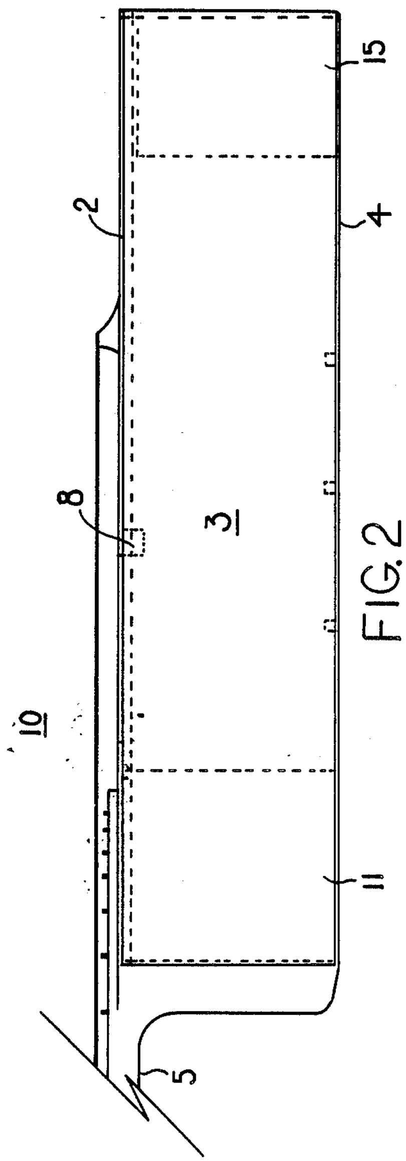
FIG. 2 is a side view of a guitar using my new blocking system.

Tail block 15 is similarly constructed to have basic isosceles triangular shape having equal concave sides 16 and a convex base 17. Tail block 15 is attached to the bottom side wall 3 and sound box back such that equal concave sides 16 are symmetrically disposed about the longitudinal axis. Referring to FIG. 2, tail block 15 is shown having a width slightly less than that of the height of side walls 3, which allows the sound box top 2 to vibrate without added dampening.

Figure 3:
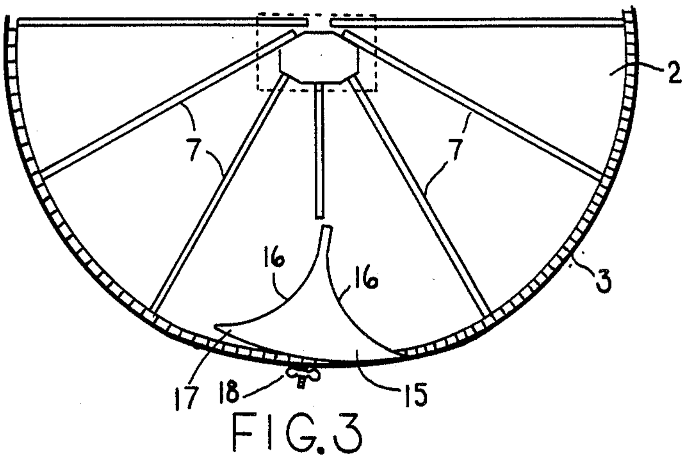
FIG. 3 is a sectional plan view of the bottom portion of a guitar resting on its top, minus its back, using a second embodiment of my new blocking system.
Figure 4:
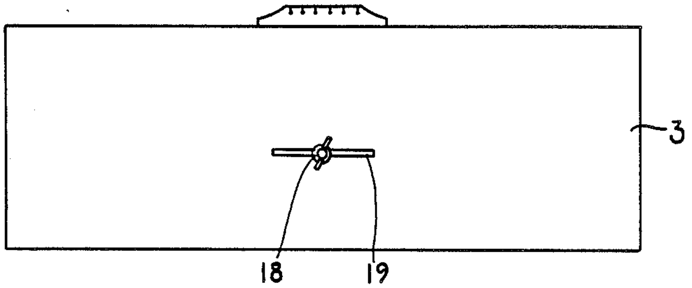
FIG. 4 is a bottom end view of the slidable attachment of a tail block according to the principles of my new invention.

In its second embodiment, as shown in FIGS. 3 and 4, tail block 15 is attached only to bottomside wall 3 via threaded stud and wing nut 18 and adjustment slot 19. The slided attachment of tail block 15 provides an adjusting mechanism for altering the dimensions of the resident cavity within the sound box 1.

The present invention, as illustrated in this preferred embodiment, allows a stringed instrument to be constructed using far less top bracing in the neck and tail areas than heretofore possible. As should be readily apparent, excess top bracing inhibits the action of sound box top 2 and therefore the overall dynamics of the stringed instrument. Additionally, the shape of neck block 11 and tail block 15 provide an improved resonant cavity which contributes substantially to the tone quality of the musical instrument.

While there is shown and described the present preferred embodiment of the invention, it is to be distinctly understood that this invention is not limited thereto but may be variously embodied to practice within the scope of the following claims.

I claim:

1. In a stringed instrument having a neck connected to a sound box which is constructed from a top, back, and sides disposed about a longitudinal axis, a blocking system which comprises:

a neck block having a substantially isosceles triangular shape, the equal length sides of which being concave and centered about the longitudinal axis, said neck block is supportively attached to said neck and further attached to said sound box top, back, and sides;

a tail block having a substantially isosceles triangular shape, the equal length sides of which being concave and centered about the longitudinal axis, said tail block being slidably attached to the bottom side wall.

2. In a musical instrument having a sound box constructed from a top, back, and side disposed about a longitudinal axis a tail block which comprises a block having a substantially isosceles triangular shape, the equal length sides of which being concave and centered about the longitudinal axis, said block being slidably attached to the bottom sidewall.

3. In a flat top acoustical instrument having a neck connected to a sound box constructed from a flap top, back and sides, disposed about a longitudinal axis, the improvement which comprises substantially reducing the number of top braces and inserting in lieu thereof (A) a neck block having a substantially isosceles triangular shape, the equal length sides of which being concave and centered about the longitudinal axis, said neck block being supportively attached to said sound box top, back, and sides, and (B) a tail block having a substantially isosceles triangular shape, the equal sides of which being concave and centered about the longitudinal axis, said tail block being attached to the back and the bottom side wall.

* * * * *